United States Patent [19]

Jalan et al.

[11] Patent Number: 4,795,684

[45] Date of Patent: Jan. 3, 1989

[54] FUEL CELL ELECTROCATALYST SUPPORT COMPRISING AN ULTRA-FINE CHAINY-STRUCTURED TITANIUM CARBIDE

[75] Inventors: Vinod Jalan, Concord; David G. Frost, Franklin, both of Mass.

[73] Assignee: Electric Power Research Institute, Inc., Palo Alto, Calif.

[21] Appl. No.: 22,461

[22] Filed: Mar. 6, 1987

Related U.S. Application Data

[60] Continuation-in-part of Ser. No. 754,018, Jul. 11, 1985, abandoned, which is a division of Ser. No. 592,526, Mar. 23, 1984, abandoned.

[51] Int. Cl.$^4$ .............................................. H01M 4/86
[52] U.S. Cl. ......................................... 429/44; 429/46
[58] Field of Search ................. 429/44, 45, 46, 42, 429/40; 423/440; 501/87

[56] References Cited

U.S. PATENT DOCUMENTS

| | | |
|---|---|---|
| 3,346,421 | 10/1967 | Thompson et al. ............. 429/44 X |
| 3,437,525 | 4/1969 | Hanel et al. ....................... 429/40 X |
| 3,756,860 | 9/1973 | Binder et al. ........................ 429/42 |
| 3,761,576 | 9/1973 | Groening ........................... 423/440 |
| 3,812,239 | 5/1974 | Swaney ............................. 423/440 |
| 4,102,819 | 7/1978 | Petrow et al. .................... 429/40 X |
| 4,359,406 | 11/1982 | Fung .................................. 429/40 X |

Primary Examiner—Anthony Skapars
Attorney, Agent, or Firm—Flehr, Hohbach, Test, Albritton & Herbert

[57] ABSTRACT

Novel titanium carbide catalyst supports and platinum/titanium carbide electrocatalysts are provided for use as electrodes in fuel cells. In particular, the novel catalysts are useful as electrodes for the reduction of oxygen in phosphoric acid fuel cells.

3 Claims, 3 Drawing Sheets

FUEL CELL ELECTROCATALYST SUPPORT COMPRISING AN ULTRA-FINE CHAINY-STRUCTURED TITANIUM CARBIDE

This application is a continuation-in-part of Ser. No. 754,018, filed July 11, 1985, now abandoned which, in turn, is a division of Ser. No. 592,526, filed Mar. 23, 1984, now abandoned.

The present invention is directed to electrocatalyst supports, and in particular to electrocatalyst supports for use in cathodes in fuel cells.

The carbon support for the cathode catalyst is an important component in a fuel cell with regard to cell efficiency and lifetime. However, electrically conductive carbon blacks do not always exhibit adequate resistance to corrosion caused by electrochemical oxidation in the fuel cell. Also, thermodynamically, carbon as a material is unstable at the cathode potential in hot phosphoric acid present in phosphoric acid fuel cells (PAFC). Corrosion at the cathode in a fuel cell contributes to the various modes of fuel cell performance decay, such as increased platinum migration due to the undercutting (i.e. corrosion of the carbon under the platinum catalyst) and increased diffusion losses due to disruption of the carbon-Teflon® interface. This places a fundamental limitation on the lifetime of fuel cell electrodes. Moreover, the recent trend towards increased temperature and pressure in the fuel cell, which leads to higher cathode potentials, increases the likelihood of carbon corrosion. Furthermore, under operating conditions in a utility, part-load operation may require that during a certain percentage of the time the oxygen electrode must be at potentials in excess of 0.8 volts, which promotes carbon corrosion. Improvements in electrolytes portend even higher potentials at the oxygen electrode.

Therefore, there is a need for new and improved support materials and catalysts for the oxygen electrode to operate under the extreme conditions of fuel cells. A typical phosphoric acid fuel cell (PAFC) is described by A. Fickett, "Fuel Cell Power Plant", *Scientific American*, 239, 70–76 (Dec. 1978).

Titanium carbide (TiC) has been identified as a satisfactory electrical conductor and appears to be stable in hot phosphoric acid at oxygen electrode potentials in a fuel cell. However, commerically available titanium carbide is relatively low in surface area ($<1$ m$^2$/gm) and therefore is not generally useful as an electrode catalyst support.

It is therefore an object of the present invention to provide titanium carbide support having a crystallite size in the range of about 50–500 Angstroms and relatively large average surface areas of 25–125 m$^2$/gm which are useful as electrocatalyst supports in fuel cells.

It is further an object of the present invention to provide novel electrocatalysts comprising platinum impregnated in a titanium carbide support.

These and other objects of the invention will be apparent from the following description of the invention.

Figure 3:
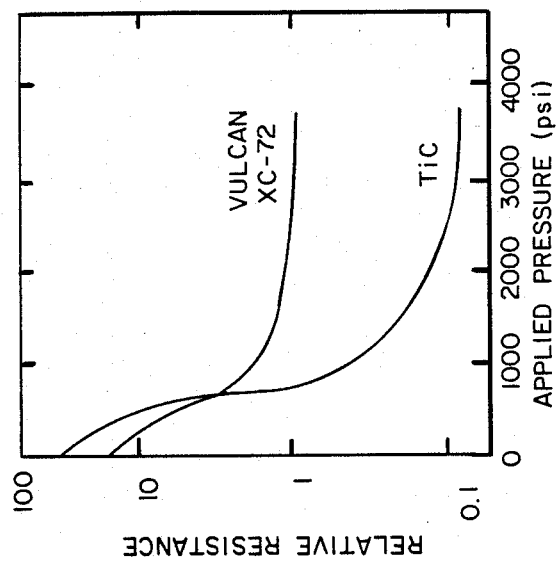
FIGS. 3 and 4 are graphs comparing the relative electrical resistance (reciprocal to electrical conductivity of FIG. 3) and electrochemical corrosion (FIG. 4) of titanium carbide with conventional carbon black supports used for PAFC electrocatalysts.

The present invention is directed to novel electrocatalyst supports and electrocatalysts used in fuel cells. The ultra-fine, open-pore, chainy-structured titanium carbide supports according to the invention are made by contacting titanium tetrachloride in the vapor phase with gaseous unsaturated hydrocarbon and hydrogen in a reaction zone in the range of 500°–1250° C. The volume of hydrogen introduced into the reaction zone is such that the volumetric ratio of hydrogen to titanium tetrachloride is greater than 6. The volume of unsaturated hydrocarbon introduced into the reaction zone is such that the titanium to carbon ratio is less than 4.

Applicants have found that titanium carbide made according to the invention unexpectedly provides the flexibility of using premixed gases, which provide a significant ease of the reactor design and considerable cost benefits. Additionally, it has surprisingly been found that the titanium carbide support of this invention has a desirable chain-like structure which maintains electrical contact and has an open porosity providing for an oxygen diffusion path and thus providing an improved electrode, particularly for use in a fuel cell. The supports according to the invention are characterized by improved electrochemical corrosion resistance and catalytic activity in fuel cells as compared to electrodes made with carbon black supports.

There are several methods for converting the titanium carbide catalyst support into catalyst by impregnation with platinum. Two methods are described. One (Method A) comprises the steps of impregnating the titanium carbide support composition with an alcoholic chloroplatinic acid solution, separating the impregnated particles from the solution, drying the particles, exposing the particles to a hydrogen atmosphere at about 400° C., and exposing the particles in a carbon monoxide atmosphere at about 350° C. A second method (Method B) for preparing an electrocatalyst comprises the steps of contacting the titanium carbide support composition with an aqueous chloroplatinic solution, aqueous sodium dithionite and dilute hydrogen peroxide.

The titanium carbide support compositions according to the present invention are characterized by particle size in the range of 50–500Å, and usually 50–400Å, with open porosity and chain-like structures.

The titanium carbide support compositions according to the present invention are prepared according to the following stoichiometric reaction:

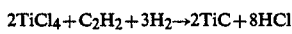

$$2TiCl_4 + C_2H_2 + 3H_2 \rightarrow 2TiC + 8HCl$$

The above reaction is conducted in the gaseous phase in the presence of only the reactant gases or, optionally, in the presence of an inert gas, such as argon. The reaction is conducted at a relatively low temperature in the range of about 500°–1250° C., preferably in the range of 500°–1100° C. The volumetric concentration of titanium tetrachloride should be relatively dilute with respect to the hydrogen gas concentration, thus the ratio of the volume of hydrogen gas introduced into the reaction zone to the volume of titanium tetrachloride should be greater than about 6. The relative concentration of the hydrocarbon gas may be higher, therefore, the volume of hydrocarbon gas used should be such that the titanium to carbon ratio in the hydrocarbon gas is less than about 4. While unsaturated hydrocarbons may be used such as ethylene, acetylene, propylene, and the like; acetylene is preferred.

The reaction may be carried out in a conventional tube furnace, and the reaction is usually completed over a period of about 2 to 10 hours. Under preferred conditions, the furnace is maintained at a temperature within the range of 500–1100° C. wherein the titanium tetrachloride vapor, hydrogen, and hydrocarbon gas are introduced either separately or premixed before introduction into the reactor. If introduced separately, the titanium tetrachloride vapor and hydrocarbon gas may be optionally introduced with an inert carrier gas such as argon. If all three gases are premixed, argon may optionally also be used as a carrier gas. A typical preparation includes maintaining the three reactant gases in the reaction zone at the preferred temperature for about 4–8 hours utilizing a total space velocity of less than $10^{-1}$ hours. To optimize completion of the reaction this will normally be followed by approximately a one hour treatment with titanium tetrachloride and hydrogen, followed by approximately a one hour treatment with hydrogen gas and cooling in an inert atmosphere.

The resulting titanium carbide comprises fine particles having particle size in the range of 50–400 Angstroms with open porosity and chain-like structures which maintain excellent particle-to-particle contact, thereby maintaining excellent electrical conductivity for a composite catalyst layer. Usually, the titanium carbide particles will have a surface area of at least 25 $m^2/g$ titanium carbide. Furthermore, such chain-like structure may be readily fabricated by conventional methods into a gas diffusion electrode for a fuel cell.

To convert the support composition into an electrocatalyst, highly dispersed platinum may be deposited onto the ultra-fine titanium carbide by various techniques to obtain a platinum surface area in the range of 20–90 $m^2/g$ platinum. The platinum surface area will usually be at least about 23 $m^2/g$, and preferably more than 50 $m^2/g$ platinum. The titanium carbides may be impregnated by contacting the titanium carbide particles with an alcoholic chloroplatinic acid solution. The concentration of the chloroplatinic acid solution will depend upon the amount of platinum which is desired to be deposited on the support. It is well within the skill of those ordinarily skilled in the art to determine the appropriate chlorplatinic acid solution concentration according to the required specifications of the particular fuel cell design.

The particles may be then separated from the solution, dried to remove the alcohol solvent, and the impregnated platinum salt may be reduced in a hydrogen atmosphere by, for example, exposing the impregnated particles to hydrogen atmosphere at about 400° C., followed by exposure to a carbon monoxide atmosphere at about 350 C. Preferably the particles should then be rapidly cooled. Usually, cooling to about 100° C. will suffice but cooling to room temperature is preferred.

Alternatively, the titanium carbide particles may be suspended in an aqueous chloroplatinic acid solution. As above, the concentration of the chloroplatinic acid and the solution and amount of solution which is used will depend upon the particular concentration of platinum which is desired on the catalyst support. This may be readily determined by those of ordinary skill in the art depending upon the required specification of the fuel cell. After contacting the particles with the chloroplatinic acid solution, the platinum salt may be reduced by contacting with an aqueous sodium dithionite solution, followed by contact with dilute hydrogen peroxide to remove excess dithionite. Similar results may be obtained by first reacting an aqueous chloroplatinic solution with sodium dithionite and hydrogen peroxide to yield a colloidal platinum suspension and then adding the titanium carbide particles to affect adsorption of very fine platinum particles on the titaninum carbide particles. Preferably, the particles should then be washed and dried to remove the remaining water.

Figure 1:
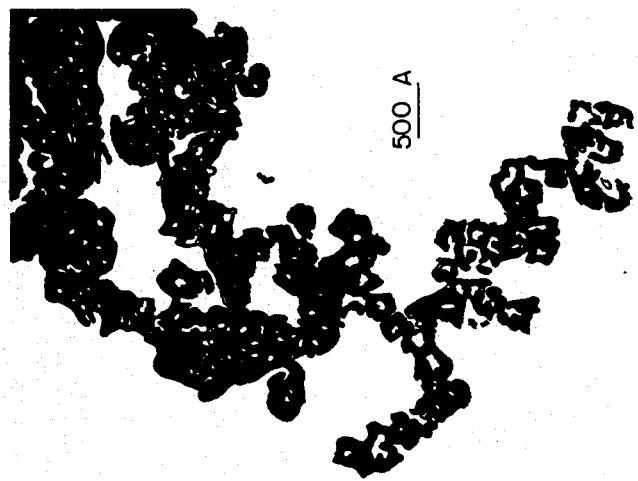
FIG. 1 is a transmission electron micrograph demonstrating an open porosity chainy structure and particle-to-particle contact which maintains excellent electrical conductivity of titanium carbide material according to the present invention.

FIG. 1 is a transmission electron micrograph demonstrating an open porosity chainy structure and particle-to-particle contact which maintain excellent electrical conductivity of titanium carbide material according to the present invention.

Figure 2:
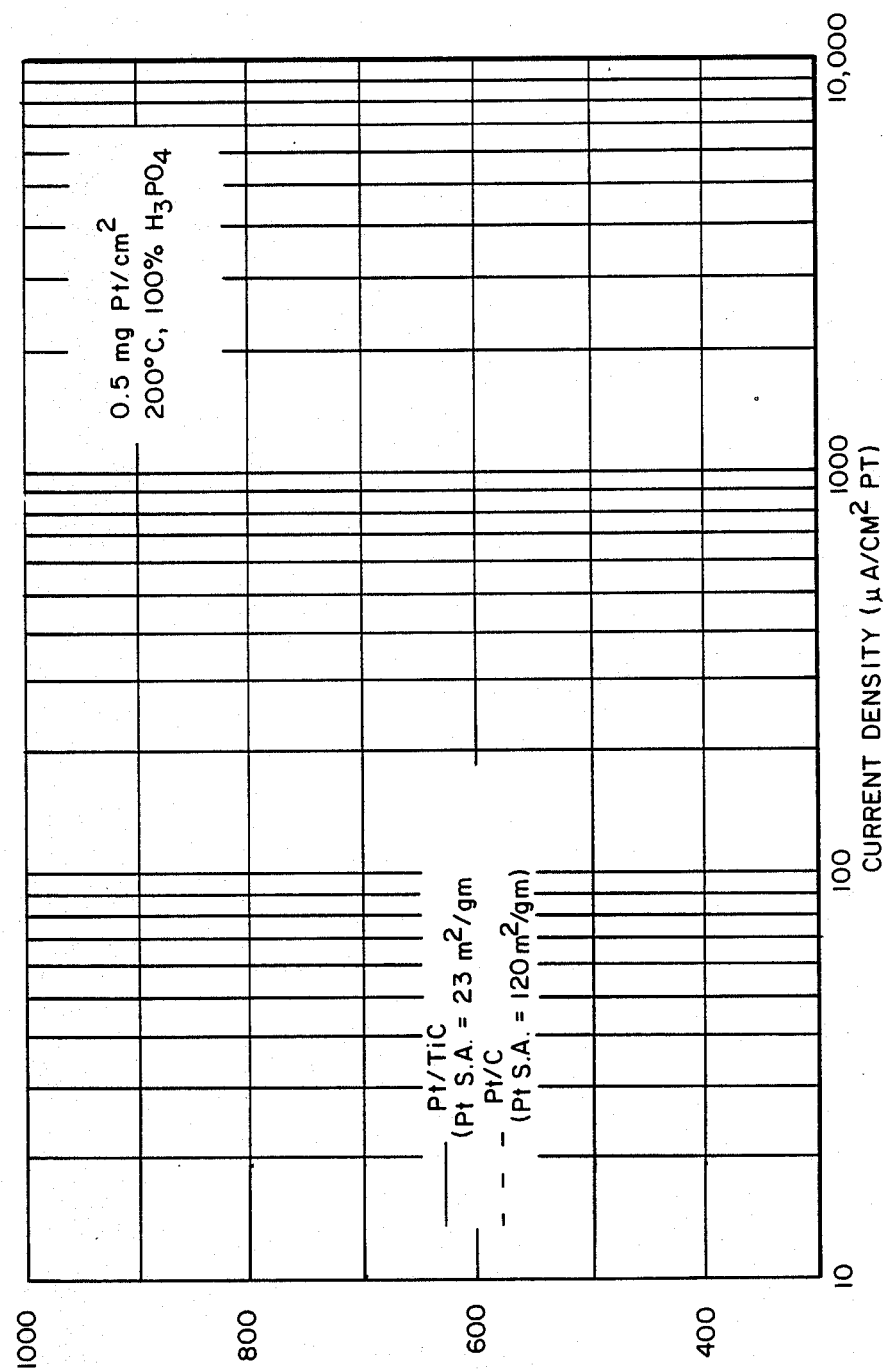
FIG. 2 is a graph comparing the oxygen reduction activity of a platinum catalyst/titanium carbide support electrocatalyst according to the present invention (solid lines) with a conventional platinum/carbon electrocatalysts (dotted lines).

Referring to FIG. 2 there is shown a graph of the oxygen reduction activity of a platinum/titanium carbide electrocatalyst according to the present invention having platinum surface area of 23 $m^2/gm$ (solid line) compared to a conventional platinum/carbon electrocatalyst having a surface area of 120 $m^2/gm$ (dotted line). Each catalyst was distributed such that there was 0.5 mg platinum/$cm^2$, and the test was conducted in a phosphoric acid fuel cell utilizing 100% phosphoric acid as electrolyte at 200° C. The ordinate in FIG. 2 represents potential in mV as measured against a reversible hydrogen electrode (RHE). As may be seen from FIG. 2, not only was the platinum/titanium carbide catalyst operable to higher current densities (i.e., to about 4500 $\mu A/cm^2$ of Pt), but it also out-performed the conventional platinum/carbon catalyst within the operable ranges of the platinum/carbon catalyst of about 18–1000 $\mu/cm^2$.

Referring to FIG. 3, there is shown a graph comparing relative electrical resistance of titanium carbide according to the invention with a commercial carbon black (Vulcan XC-72), conventionally used as an electrocatalyst support in fuel cells containing phosphoric acid electrolyte. The relative resistance of the titanium carbide support is significantly lower than that of the carbon black at pressures above about 800 psi.

Figure 4:
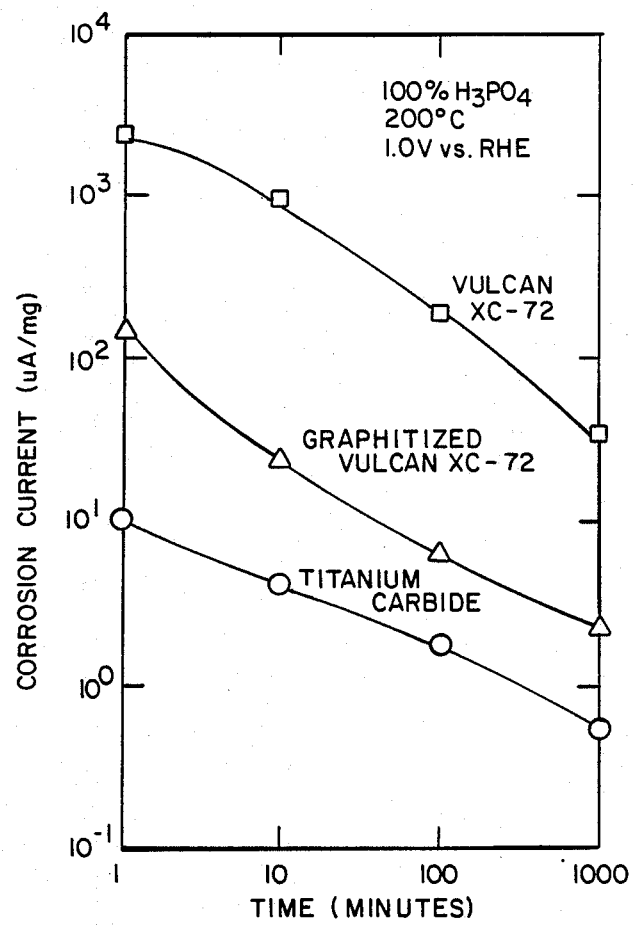
Figure 2:
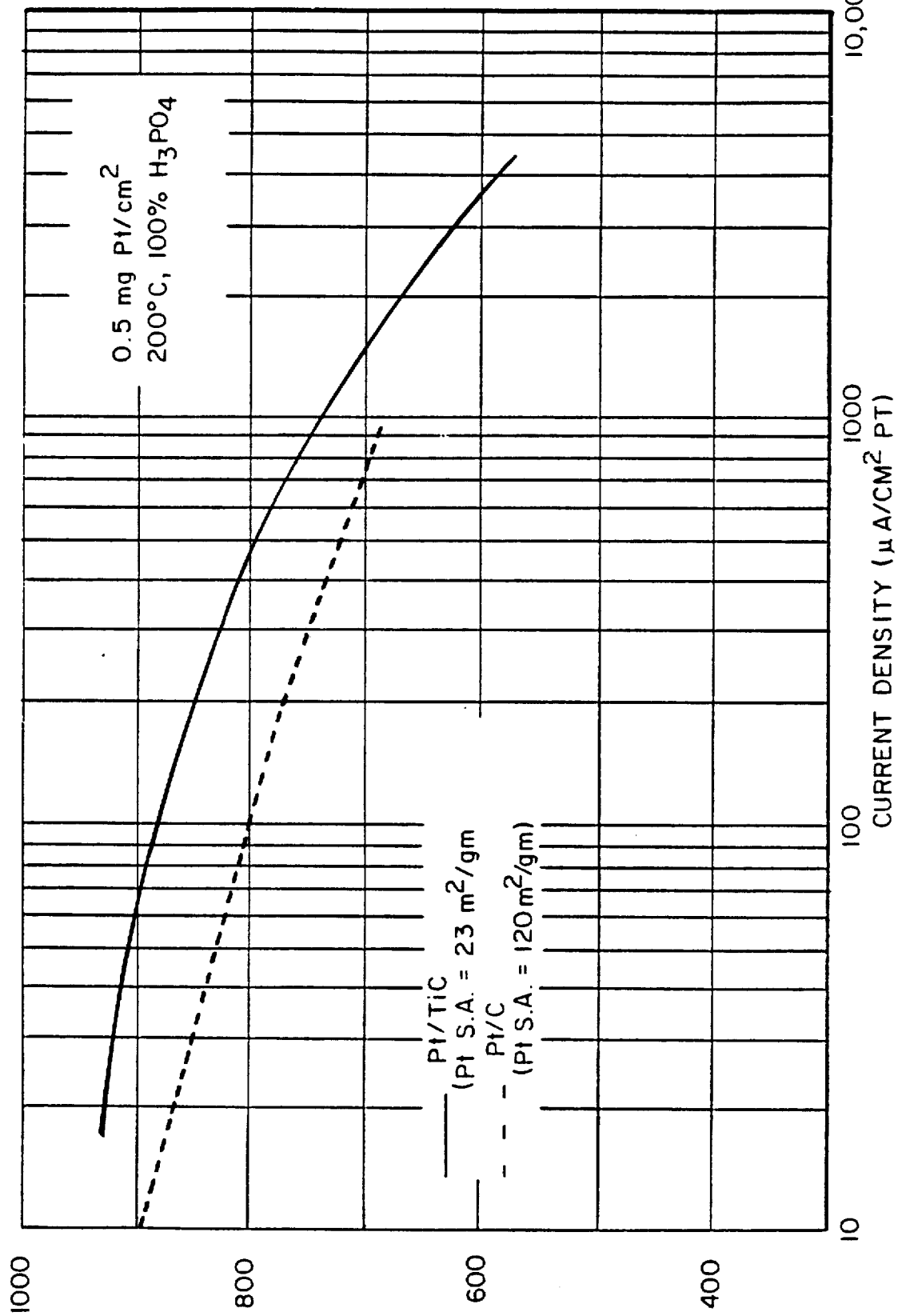

Referring to FIG. 4, there is shown a graph of corrosion current (a measure of electrochemical corrosion) over time, comparing titanium carbide of the invention with two commercial carbon blacks conventionally used as electrochemical supports. The titanium carbide exhibits lower corrosion current (thus, better corrosion resistance) at all data points than both of the carbon black materials.

From the above description of the preferred embodiments of the invention, it will be apparent to those of ordinary skill in the art that certain modifications and alternatives may be made without departing from the spirit of the invention. It is intended that such alternatives and modifications shall be within the scope of the present invention.

It is claimed that:

1. In an electrochemical fuel cell, the improvement comprising an oxygen-reducing cathode comprising a catalyst on titanium carbide support, said support characterized by a particle size of 50–400 Angstroms with open porosity and chain-like structure formed by contacting titanium tetrachloride in the vapor phase with gaseous unsaturated hydrocarbon and hydrogen at a temperature in the range of 500°–1100° C., a surface area of at least 25 m²/g, and by improved electrochemical corrosion resistance over carbon black supports, and by improved catalytic activity over a cathode consisting of the same amount of said catalyst supported on carbon black.

2. A fuel cell according to claim 1 wherein said titanium carbide support is formed by utilizing a volumetric ratio of hydrogen to titanium tetrachloride greater than about 6, and the volume of hydrocarbon utilized is such that the titanium-to-carbon ratio is less than about 4.

3. A fuel cell according to claim 1 containing phosphoric acid as an electrolyte.

* * * * *

UNITED STATES PATENT AND TRADEMARK OFFICE
CERTIFICATE OF CORRECTION

PATENT NO. : 4,795,684

DATED : January 3, 1989

INVENTOR(S) : Jalan, et al.

It is certified that error appears in the above-identified patent and that said Letters Patent is hereby corrected as shown below:

The title page should be deleted to appear as per attached title page.

Figure 2 should be deleted to appear as per attached Figure 2.

Signed and Sealed this

Fourteenth Day of November, 1989

*Attest:*

JEFFREY M. SAMUELS

*Attesting Officer*     *Acting Commissioner of Patents and Trademarks*

United States Patent
Jalan et al.

[11] Patent Number: 4,795,684
[45] Date of Patent: Jan. 3, 1989

[54] FUEL CELL ELECTROCATALYST SUPPORT COMPRISING AN ULTRA-FINE CHAINY-STRUCTURED TITANIUM CARBIDE

[75] Inventors: Vinod Jalan, Concord; David G. Frost, Franklin, both of Mass.

[73] Assignee: Electric Power Research Institute, Inc., Palo Alto, Calif.

[21] Appl. No.: 22,461

[22] Filed: Mar. 6, 1987

Related U.S. Application Data

[60] Continuation-in-part of Ser. No. 754,018, Jul. 11, 1985, abandoned, which is a division of Ser. No. 592,526, Mar. 23, 1984, abandoned.

[51] Int. Cl.$^4$ .............................................. H01M 4/86
[52] U.S. Cl. .................................... 429/44; 429/46
[58] Field of Search ................. 429/44, 45, 46, 42, 429/40; 423/440; 501/87

[56] References Cited

U.S. PATENT DOCUMENTS

| | | | |
|---|---|---|---|
| 3,346,421 | 10/1967 | Thompson et al. | 429/44 X |
| 3,437,525 | 4/1969 | Hanel et al. | 429/40 X |
| 3,756,860 | 9/1973 | Binder et al. | 429/42 |
| 3,761,576 | 9/1973 | Groening | 423/440 |
| 3,812,239 | 5/1974 | Swaney | 423/440 |
| 4,102,819 | 7/1978 | Petrow et al. | 429/40 X |
| 4,359,406 | 11/1982 | Fung | 429/40 X |

Primary Examiner—Anthony Skapars
Attorney, Agent, or Firm—Flehr, Hohbach, Test, Albritton & Herbert

[57] ABSTRACT

Novel titanium carbide catalyst supports and platinum/titanium carbide electrocatalysts are provided for use as electrodes in fuel cells. In particular, the novel catalysts are useful as electrodes for the reduction of oxygen in phosphoric acid fuel cells.

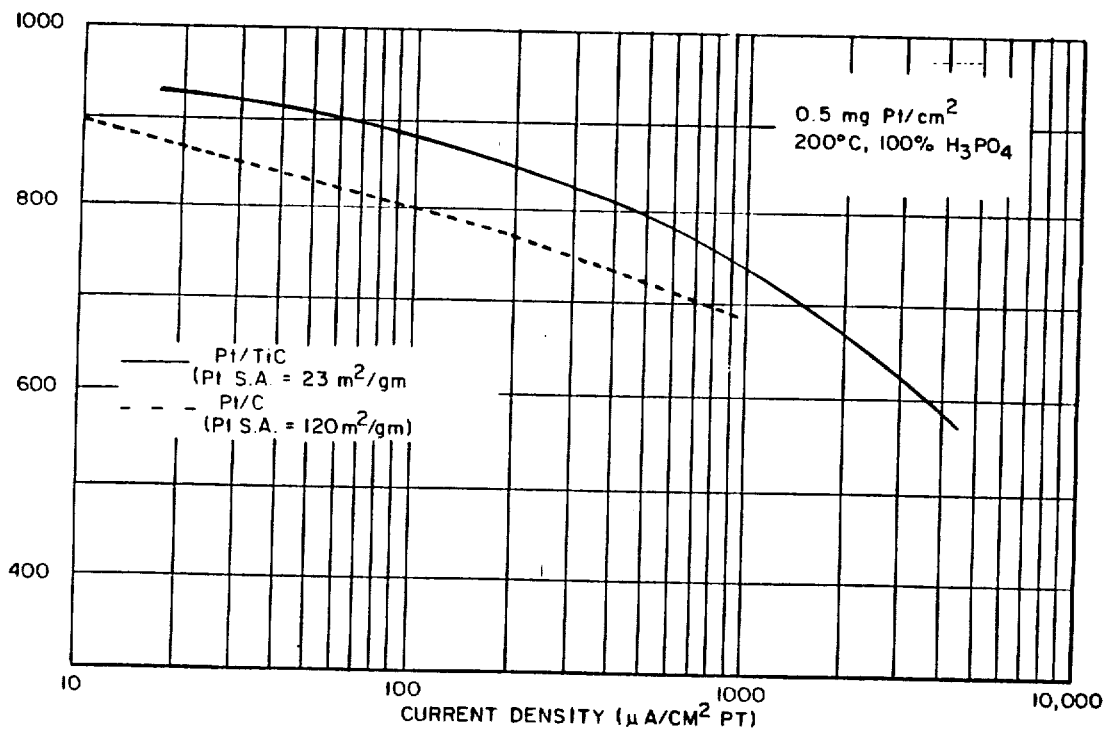

3 Claims, 3 Drawing Sheets